June 14, 1932.   G. B. REED   1,863,126
WHEEL CONSTRUCTION
Filed Oct. 17, 1929

INVENTOR.
GEORGE B. REED
BY
ATTORNEY.

Patented June 14, 1932

1,863,126

UNITED STATES PATENT OFFICE

GEORGE B. REED, OF PHILADELPHIA, PENNSYLVANIA, ASSIGNOR TO BUDD WHEEL COMPANY, OF PHILADELPHIA, PENNSYLVANIA, A CORPORATION OF PENNSYLVANIA

WHEEL CONSTRUCTION

Application filed October 17, 1929. Serial No. 400,175.

The wheel of my invention comprises a rim transversely of angle cross section, such for example, as a drop center rim which enters especially into the form of the invention which I have described, a spoke wheel body, and spoke end sockets having attaching flanges transversely of the socket at an angle to each other and complemental to the angle cross section of the rim. Drop center rims particularly are transversely of radially stepped cross section from the bottom of the drop center outwardly. The interconnecting spoke end and rim sockets are complementally transversely radially stepped in a complemental fashion, and their stepped portions, constituted as flanges, are connected to the bottom of the drop center section, to the one side of the drop center section and to the adjacent marginal portion of the rim which receives the tire bead. Preferably the spoke end sockets are cylindrical in form, forged or die stamped in the form of cups and their angle cross sections are transversely disposed, emanate from a point intermediate the ends, and terminate at one end.

The construction is of especial advantage in offsetting spoked wheel bodies from the plane of the tread of the wheel. It affords every necessary latitude for such adjustment. At the same time it affords an inherently snug, solid, secure and durable seating, and a strong and effective but easily made inter-connection between the spoke ends and any angle section rim member whatsoever, whether it be drop center or other.

The showing of the accompanying drawing consists of

Figure 1:
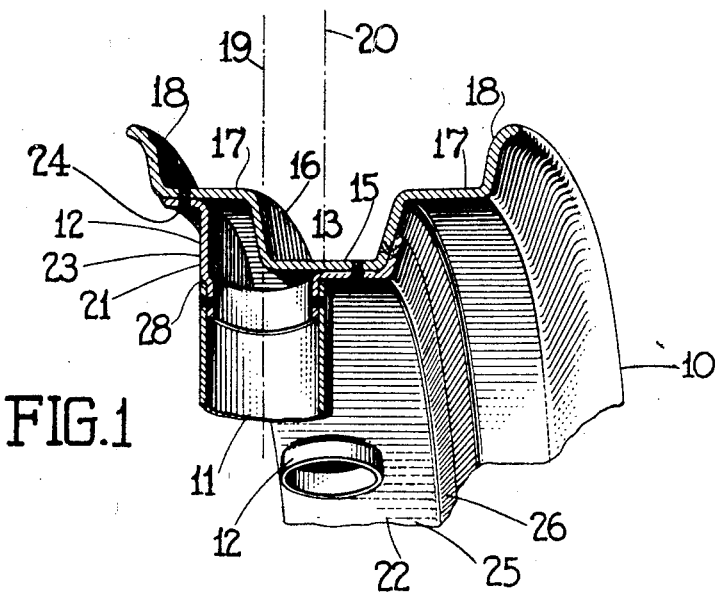
Figure 2:
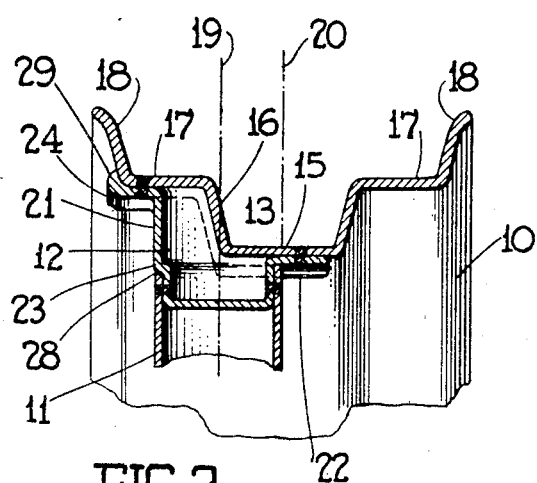
Figure 3:
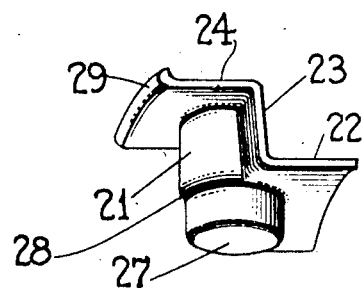
Figure 4:
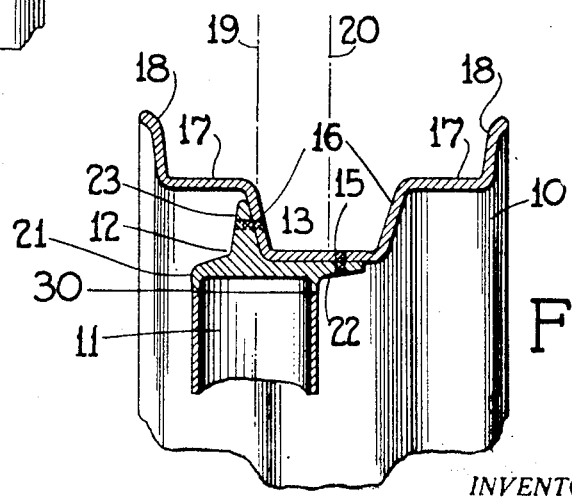
Figure 5:
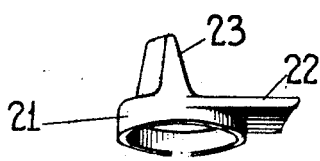

Figure 1 which is a perspective view of a segment of the wheel showing portions of a spoke connected with one end transversely cross sectioned on the axis of the spoke;

Figure 2, which is an orthognal transverse section on the axis of the spoke of a modified form;

Figure 3, which is a three quarter perspective view from the inside of a wheel of one of the spoke end sockets;

Figure 4, which is an orthognal transverse projection on the axis of a spoke showing a third modification; and Figure 5, which is a perspective view of the spoke end socket of this modification similar to that of Fig. 3.

Drop center rims are shown but others may be used. They are designated 10 throughout the drawing. The spokes of the wheel body, which are shown, are designated 11. The interconnecting spoke end and rim sockets are designated 12. The drop center rim illustrated comprises drop center section 13 having bottom walls 15, side walls 16, tire bead receiving margins 17 and side flanges 18.

The wheel body illustrated is of the metal tubular spoke artillery type. The spoke ends are open. They extend in the forms illustrated almost to the bottom 15 of the drop center section 13 of the rim. The axes 19 of the spokes lie in the medial plane of the wheel body but are displaced laterally from the plane of tread indicated by the line 20.

The spoke end and rim interconnecting sockets comprise substantially cylindrical main bodies 21 having side walls provided with flanges 22—23—24 transversely extending, and radially of stepped form, emanating intermediately of the ends of the cylindrical main body 21 and terminating in one end. Indeed, the side walls terminate in the flanges 22—23—24. Both the main body 21 and the flanges 22—23—24 therefor are of stepped form. They are both complemental to the stepped transverse cross section of the rim 10.

The main bodies 21 in the forms of Figs. 1, 2 and 3 are telescoped within the open ends of the spokes 11. The flanges 22—23—24 are secured respectively to the bottom wall 15 of the drop center portion 13, to the one side wall 16 of the section, and to the adjacent tire bead receiving section 17 of the rim. Securement may be made by spot welding or otherwise.

In the form shown in Fig. 1, the spoke end sockets 12 are formed as integral parts of a rim member 25 in the form of a felloe. Flanges 22—23—24 are continuous around the circumference of the felloe. Flange 23 may or may not in this form be connected to the side wall 16. In addition, flange 22 has an outwardly bent margin 26 secured to the side wall 16 of the drop center 13 remote from the flange 24. The bottoms of the main bodies 21 and the sockets 12 are open.

In the form shown in Figs. 2 and 3, the spoke end sockets are separated and embodied in unitary stampings or forgings of the form of Fig. 3. The main bodies 21 are cup shaped and the bottoms or inner ends 27 of the cups are closed. In each of the forms of Figs. 1 and 3 the bottom portions of the main bodies are of reduced cross section to fit within the open ends of the spokes 11 whereby shoulders 28 are provided to abut snugly the ends of the tube. In the form of Figs. 2 and 3 flange 24 is provided with an outwardly bent margin 29 which overlaps and may be secured to the adjacent side flange 18 of the rim.

The form of Figs. 4 and 5 is especially adapted for production by forging. In it the endmost flange 24 is omitted. In it too the main body 21 of the socket is foreshortened. The top of the body 21 is closed by the flanges 22—23 while the bottom is open and the section hollow. The diameter and thickness of the side walls are substantially equal to the diameter and thickness of the end walls of the spokes 11. The inner ends of these sockets are flash welded to the outer ends of the spokes 11 as indicated at 30. The flange 22 is secured to the bottom of the drop center rim section 13 and flange 23 to the adjacent side wall 16.

The diversity of modification shown herein is an indication of considerable further diversity. Each and all embodiments of my invention which fall within its generic spirit should be protected to me by the annexed claims as well as those disclosed.

What I claim as new and useful and desire to protect by Letters Patent is:—

1. A wheel having a drop center rim, and a spoked wheel body the spokes of which have their ends connected to both a side and to the bottom of the drop center section of the rim.

2. A wheel having a drop center rim and a spoked wheel body the spokes of which have their ends connected both to the bottom and to a tire bead receiving margin of the drop center rim.

3. A wheel having a drop center rim and a spoked wheel body the spoke ends of which are connected both to the side of the drop center and to a tire bead receiving margin of the rim.

4. A wheel comprising a drop center rim and a spoked wheel body the spoke ends of which are connected each commonly to the bottom and a side of the drop center and to a tire bead receiving margin of said rim.

5. A wheel comprising a drop center rim, a spoked wheel body, and cupped spoke end sockets interconnecting the spokes and the rim, which sockets telescope within the ends of the spokes and are provided with side walls terminated on one side of the wheel beneath and secured to the bottom of the drop center of the rim and on the other side of the wheel extended and secured to rim portions radially beyond the bottom of the drop center.

6. A spoke end socket comprising a substantially cylindrical main body provided with axially spaced laterally extended flanges arranged in planes spaced radially of the wheel.

In testimony whereof he hereunto affixes his signature.

GEORGE B. REED.